United States Patent
Piry et al.

(10) Patent No.: US 9,223,701 B2
(45) Date of Patent: Dec. 29, 2015

(54) DATA PROCESSING APPARATUS AND METHOD FOR PERFORMING LOAD-EXCLUSIVE AND STORE-EXCLUSIVE OPERATIONS

(71) Applicant: ARM LIMITED, Cambridge (GB)

(72) Inventors: Frederic Claude Marie Piry, Cagnes-sur-Mer (FR); Philippe Jean-Pierre Raphalen, Valbonne (FR); Melanie Emanuelle Lucie Teyssier, Grasse (FR); Albin Pierick Tonnerre, Sophia Nice (FR)

(73) Assignee: ARM Limited, Cambridge (GB)

( * ) Notice: Subject to any disclaimer, the term of this patent is extended or adjusted under 35 U.S.C. 154(b) by 340 days.

(21) Appl. No.: 13/861,622

(22) Filed: Apr. 12, 2013

(65) Prior Publication Data
US 2014/0310480 A1 Oct. 16, 2014

(51) Int. Cl.
G06F 9/30 (2006.01)
G06F 9/38 (2006.01)
G06F 12/08 (2006.01)

(52) U.S. Cl.
CPC ............. G06F 12/0831 (2013.01); G06F 9/30 (2013.01); G06F 12/0815 (2013.01)

(58) Field of Classification Search
None
See application file for complete search history.

(56) References Cited

U.S. PATENT DOCUMENTS

| | | | | | |
|---|---|---|---|---|---|
| 5,742,785 | A | * | 4/1998 | Stone et al. | 712/217 |
| 5,892,954 | A | * | 4/1999 | Tomas et al. | 710/200 |
| 6,128,706 | A | * | 10/2000 | Bryg et al. | 711/141 |
| 6,216,200 | B1 | * | 4/2001 | Yeager | 711/100 |
| 6,460,124 | B1 | * | 10/2002 | Kagi et al. | 711/163 |
| 6,487,642 | B1 | * | 11/2002 | Duruoz | G06F 9/45512 711/145 |
| 7,346,747 | B1 | * | 3/2008 | Nussbaum et al. | 711/154 |
| 7,590,742 | B2 | * | 9/2009 | Hippelainen | H04L 12/14 370/230 |
| 8,090,930 | B2 | * | 1/2012 | Fischer et al. | 712/215 |
| 2003/0037223 | A1 | * | 2/2003 | Steely et al. | 712/28 |
| 2004/0123058 | A1 | * | 6/2004 | Hum et al. | 711/163 |
| 2004/0199734 | A1 | * | 10/2004 | Rajamani et al. | 711/163 |
| 2012/0117333 | A1 | * | 5/2012 | Akkary et al. | 711/145 |

FOREIGN PATENT DOCUMENTS

GB 2491350 12/2012

OTHER PUBLICATIONS

GB Search Report dated Jul. 31, 2014 in GB 1403326.0, 3 pages.

* cited by examiner

Primary Examiner — Yaima Rigol
(74) Attorney, Agent, or Firm — Nixon & Vanderhye P.C.

(57) ABSTRACT

A data processing apparatus is provided in which a processor unit accesses data values stored in a memory and a cache stores local copies of a subset of the data values. The cache maintains a status value for each local copy stored in the cache. When the processor unit executes a load-exclusive operation, a first data value is loaded from a specified memory location and an exclusive use monitor begins monitoring the specified memory location for accesses. When the processor unit executes a store-exclusive operation, a second data value is stored to the specified memory location if the exclusive use monitor indicates that the first data value has not been modified since the load-exclusive operation was executed. When a local copy of the first data value is stored in the cache and the status value for the local copy of the first data value indicates that the processor unit has exclusive usage of the first data value, the data processing apparatus is configured to prevent modification of the status value for a predetermined time period after the processor unit has executed the load-exclusive operation.

17 Claims, 5 Drawing Sheets

FIG. 1

```
LOCK MUTEX:

LDR    r1, =locked
1   LDREX  r2, [r0]
    CMP    r2, r1          ; test if MUTEX is locked
    BEQ    %f2             ; wait if locked
    STREXNE r2, r1, [r0]   ; not locked, lock it
    CMPNE  r2, #1          ; check if STREX failed
    BEQ    %b1             ; failed - retry from 1
    ........               ; lock acquired 2   ; waiting for MUTEX to become unlocked
    WAIT_FOR_UPDATE
    B      %b1             ; retry from 1
```

DATA PROCESSING APPARATUS AND METHOD FOR PERFORMING LOAD-EXCLUSIVE AND STORE-EXCLUSIVE OPERATIONS

BACKGROUND OF THE INVENTION

1. Field of the Invention

The present invention relates to a data processing apparatus configured to perform data processing operations by executing instructions. More particularly, this invention relates to a data processing apparatus configured to execute a load-exclusive operation and a store-exclusive operation.

2. Background

It is known to provide a data processing apparatus which is configured to execute load-exclusive operations and store-exclusive operations, the execution of these operations being linked to an exclusive use monitor provided in the data processing apparatus. Execution of the load-exclusive operation not only loads a data value from a specified memory location but also causes the exclusive use monitor to begin monitoring that specified memory location. Thereafter, a store-exclusive operation which seeks to store a data value to that memory location may only do so if the exclusive use monitor indicates that the data value loaded by the load-exclusive operation at that memory location has not been modified in the interim period. This may, for example, be of benefit in the context of a memory shared between multiple processor units, so that a given processor unit can be assured to have exclusive, uninterrupted access to a given memory location, despite that memory location also being accessible to other processor units.

It is also known to provide a processor unit in a data processing apparatus with a cache which is configured to store local copies of a subset of the data values which that processor unit accesses in a memory. Data processing operations are then carried out with respect to those local copies, rather than the original copies in memory, significantly reducing the associated access times due to the speed with which a local cache can be accessed by comparison with an external memory. Such a cache will typically be configured to manage the local copies of data values which it stores independently of the processor unit, for example by initiating the retrieval of data values from the memory for which a local copy is not currently stored when the processor unit requests that data value, by maintaining a status value for each local copy stored in the cache (e.g. marking when the local copy has been modified by the processor unit) and so on. However, in a data processing apparatus which is configured to execute load-exclusive and store-exclusive operations, which also has a local cache, the possibility arises for the mechanisms associated with execution of the load-exclusive and store-exclusive operations to conflict with the mechanisms associated with the administration of the cache. In particular, when a load-exclusive and store-exclusive pair of operations are carried out, it is desirable if the store-exclusive operation is allowed to complete as soon as possible, without being delayed by the above mentioned cache management mechanisms.

Accordingly, it would be desirable to provide an improved technique for operating a data processing apparatus configured to perform load-exclusive and store-exclusive operations when the processor unit has an associated cache configured to store local copies of data values used by the processor unit in its data processing operations.

SUMMARY

Viewed from a first aspect, a data processing apparatus is provided comprising: a processor unit configured to perform data processing operations by executing instructions, said data processing operations comprising accessing data values stored in a memory;

a cache configured to store local copies of a subset of said data values, wherein said cache is configured to maintain a status value for each local copy stored in said cache; and an exclusive use monitor configured to monitor a selected memory location for accesses, wherein said processor unit is configured to execute a load-exclusive operation, said load-exclusive operation comprising loading a first data value from a specified memory location and causing said exclusive use monitor to begin monitoring said specified memory location, wherein said processor unit is configured to execute a store-exclusive operation, said store-exclusive operation comprising storing a second data value to said specified memory location if said exclusive use monitor indicates that said first data value at said specified memory location has not been modified since said load-exclusive operation was executed, and wherein, when a local copy of said first data value is stored in said cache and said status value for said local copy of said first data value indicates that said processor unit has exclusive usage of said first data value, said data processing apparatus is configured to prevent modification of said status value for a predetermined time period after said processor unit has executed said load-exclusive operation.

The present techniques recognise that the mechanisms provided in a cache to administer the local copies of the data values stored therein have the potential to disrupt efficient execution of a load-exclusive and store-exclusive pair of operations. The load-exclusive and store-exclusive operations may be initiated in a number of different ways in a processor unit, but each will typically be initiated by a corresponding instruction, such that a load-exclusive instruction and a store-exclusive instruction form part of the instruction set of the processor unit. With regard to the potential disruption of the load-exclusive and store-exclusive operations, it has in particular been recognised that when a local copy of the data value to be loaded by the load-exclusive operation is found to be stored in the cache, and a status value maintained by the cache for that local copy indicates that the processor unit has exclusive usage of that data value, the store-exclusive operation, when executed, should in principle be able to complete very quickly. However, it has been found that undesirable delay in completion of the store-exclusive operation can arise if the status value of that cached data value is modified between the execution of the load-exclusive operation and the store-exclusive operation. This is because the cache management mechanisms provided with the cache are typically such that if the processor unit seeks access to a data value for which a local copy is stored in the cache and that local copy is marked in a way that indicates that the processor unit does not have exclusive usage of that data value, various actions will then be taken by the cache before it provides the processor unit with the requested data value. For example, it may need to update the data value from the memory or interact with another cache (e.g. belonging to another processor unit) which also has a local copy of that data value and so on. By contrast, where the status value still indicates that the processor unit has exclusive usage of the data value, the store-exclusive operation should be able to complete very quickly and therefore in order to support the fast completion of such store-exclusive operations, the present techniques protect that exclusive usage status by preventing modification of the status value after the processor unit has executed the load-exclusive operation. This modification prevention is however not indefinite, since it is recognised this could lead to a deadlock scenario and accordingly modification of the status value is prevented for a predetermined time period after the processor unit has executed the load-exclusive operation. This predetermined time period can be adjusted in dependence on the particular system requirements, but is fundamentally set to cover the period in which the store-exclusive operation can be expected to be executed after the execution of the load-exclusive operation.

In some embodiments, said memory is shared with at least one other processor unit and said cache is configured to maintain said status value for each local copy stored in said cache in dependence on a coherency protocol administered for said processor unit and said at least one other processor unit. Alternatively the memory may be "shared" by multiple processes running on a single processor unit. However, as mentioned above, the sharing of the memory with another processor unit presents a particular scenario in which the cache administration mechanisms are liable to disrupt the fast execution of the store-exclusive operation following the load-exclusive operation. In particular a coherency protocol administered by the respective caches of the two processor units may cause such disruption. For example, each cache may be configured to administer a MESI (Modified/Exclusive/Shared/Invalid) protocol.

In some embodiments the data processing apparatus further comprises a pending instruction queue populated by pending instructions which have been decoded but not yet executed, wherein said data processing apparatus is configured to prevent modification of said status value with reference to said pending instructions. A pending instruction queue has the advantage that more efficient instruction execution may be carried out by the processor unit since decoded instructions can be issued for execution as soon as the processing unit has availability to execute another instruction, without any delay associated with the decoding slowing this execution down. The present techniques may take advantage of such a pending instruction queue, since the pending instructions in that queue are one potential source of modification of the status value in the cache. Hence, examination of the pending instructions in the pending instruction queue can allow an identification of (at least possible) upcoming modification of the status value and the data processing apparatus can then take appropriate preventative measures.

There are various ways in which the data processing apparatus could take such preventative measures, but in one embodiment said data processing apparatus is configured to identify a first set of pending instructions in said pending instruction queue when an instruction configured to cause execution of at least part of said load-exclusive operation is in said pending instruction queue, wherein execution of said first set of pending instructions must be completed before execution of said store-exclusive operation completes, and said data processing apparatus is configured to prioritise execution of said first set of pending instructions. When seeking to ensure that the store-exclusive operation is completed as soon as possible, it may be the case that some pending instructions must be completed before the store-exclusive operation is executed. Hence, the data processing apparatus can be configured to identify such instructions as a first set of pending instructions and to prioritise their execution, so that the store-exclusive operation can then be executed as soon as possible. There may be various reasons why a particular instruction must be completed before execution of said store-exclusive operation completes. For example, it may be due to the fact that the instruction will cause performance of an operation with respect to the same specified memory location. Alternatively, it may be due to the fact that a data memory barrier following the instructions of the first set has enforced this ordering.

One particular reason why some pending instructions must be completed before the store-exclusive operation is executed may be a hazard condition risk and in some embodiments execution of said first set of pending instructions must be completed before execution of said store-exclusive operation completes to avoid a hazard condition risk with respect to said specified memory location. For example, another instruction which comes before a load-exclusive instruction in program order and which will cause modification of the data value at the specified memory location will even need to be executed before the load-exclusive instruction to ensure that a hazard condition does not occur.

It may however not be known when an instruction is in the pending instruction queue if execution of that instruction could cause a hazard condition with respect to the specified memory location, for example, because the memory address to be accessed by execution of that instruction is not yet known (e.g. will only be generated after the instruction is issued from the pending instruction queue). In order to avoid the risk that this kind of instruction also affects the specified memory location, these instructions, for which the target memory address is not yet known, can also be included in the first set of pending instructions.

In some embodiments, said data processing apparatus is configured to allow instructions in said first set of pending instructions to complete before said load-exclusive operation completes, even if said instructions in said first set of pending instructions have been scheduled to complete after said load-exclusive operation. Allowing this first set of pending instructions to complete before the load-exclusive operation completes has the advantage that subsequently the time between completion of the load-exclusive operation and the store-exclusive operation is minimised. This in turn increases the chances of the successful execution of the store-exclusive operation.

In some embodiments said data processing apparatus is configured to identify a second set of pending instructions in said pending instruction queue when an instruction configured to cause execution of at least part of said load-exclusive operation is in said pending instruction queue, wherein execution of instructions of said second set of pending instructions will not affect said specified memory location, but said execution of instructions of said second set of pending instructions has potential to affect said local copy of said first data value stored in said cache, and said data processing apparatus is configured to prevent said modification of said status value for said predetermined time period by preventing said second set of pending instructions from affecting said local copy of said first data value stored in said cache.

It is thus recognised that modification of the status value in the cache may result from the execution of an instruction which has the potential to affect the local copy of the first data value stored in the cache. This could happen for a number of different reasons, such as execution of that instruction causing the cache line containing that first data value to be evicted from the cache. For example, even if the target memory address of that instruction is different from the specified memory location, the portion of the memory address used to index into the cache could be the same, and therefore execution of that instruction has the potential to affect the local copy of the first data value stored in the cache. To prevent this from happening, preventative measures can be taken to stop such instructions from affecting the local copy of the first data value stored in the cache.

It may however not be known when an instruction is in the pending instruction queue if execution of that instruction will interfere with the local copy of the first data value stored in the cache, for example, because the memory address to be accessed by execution of that instruction is not yet known (e.g. will only be generated after the instruction is issued from the pending instruction queue). In order to avoid the risk that this kind of instruction also affects the local copy of the first data value stored in the cache, these instructions, for which the target memory address is not yet known, can also be included in the second set of pending instructions.

When such a second set of pending instructions is identified, the data processing apparatus may take a variety of preventative measures, but in one embodiment said data processing apparatus is configured to cause said second set of pending instructions to stall for said predetermined time period. Stalling these instructions is thus an expedient mechanism for preventing any modification of the status value with a local copy of the first data value.

There are various mechanisms by which the data processing apparatus could cause the second set of pending instructions to stall, but in one embodiment said data processing apparatus comprises a load-store unit configured to execute load instructions and store instructions, wherein said load-store unit comprises a set of slots to which each load or store instruction currently being handled is allocated, and wherein said load-store unit is configured to lock for said predetermined time period at least one said slot to which an instruction of said second set of pending instructions is allocated. Where an instruction is allocated to a slot of the load-store unit, further progress of that instruction, in particular that may affect the relevant cache content, may expediently be prevented by locking that slot.

Prevention of modification of the status value may also be implemented within the cache, for example in some embodiments data processing apparatus is configured to prevent modification of said status value by locking access to at least part of said cache. Hence, the cache content can be protected by locking access to at least that part of the cache that contains the local copy of the data value.

Locking access to the cache could take place in a number of ways, but in some embodiments said data processing apparatus is configured to prevent modification of said status value by locking access to a cache line in which said local copy of said first data value is stored said cache. Hence a more limited locking of the cache may be carried out, advantageously allowing access to other parts of the cache to carry on in the interim, by only locking access to the cache line in which the local copy of the first data value is stored.

In some embodiments locking access to at least part of the cache may be implemented in that said cache is configured to store each said local copy of a data value in a location in said cache determined by an index portion of a memory address of said data value, and wherein said data processing apparatus is configured to prevent modification of said status value by locking access to regions of said cache identified by said index portion. Hence, the cache may lock the use of a particular index portion of a memory address, which will then lock access to one or more cache lines (more than one in the case of an set-associative cache).

In some embodiments the data processing apparatus further comprises a timer configured to run for said predetermined time period, wherein said data processing apparatus is configured to start said timer when said processor unit executes said load-exclusive operation.

In some embodiments said data processing apparatus is configured to count elapsed clock cycles after said processor unit executes said load-exclusive operation, and said predetermined time period is determined as a predetermined number of elapsed clock cycles.

In some embodiments said data processing apparatus is configured to determine, for each of multiple instances of execution of said load-exclusive operation followed by said store-exclusive instruction, a relative timing of execution of said store-exclusive operation by said processor unit and an end of said predetermined time period after said processor unit has executed said load-exclusive operation. The duration of the predetermined time period can be set in dependence on the particular system requirements, however it is advantageous if the predetermined time period is closely aligned with the completion of the store-exclusive operation. Whilst the end of the predetermined time period should come after completion of the store-exclusive operation (in order to ensure that the store-exclusive operation completes unimpeded by modification of the status value of the local copy of the first data value), there should ideally not be too long a period after completion of the store-exclusive operation and before the end of the predetermined time period, so that normal (full) cache usage can resume as soon as possible. Accordingly, it is advantageous if the data processing apparatus is configured to monitor, on an on-going basis, the relative timing of these two events, such that the predetermined time period can be modified to improve performance if necessary.

Accordingly, in one embodiment said data processing apparatus is configured to increase said predetermined time period if more than a predetermined number of said relative timings indicate that execution of said store-exclusive operation by said processor unit has occurred after said end of said predetermined time period after said processor unit has executed said load-exclusive operation. Similarly, in one embodiment, said data processing apparatus is configured to decrease said predetermined time period if more than a predetermined number of said relative timings indicate that execution of said store-exclusive operation by said processor unit has occurred more than a predetermined margin before said end of said predetermined time period after said processor unit has executed said load-exclusive operation. Hence, the data processing apparatus can modify the predetermined time period to ensure that on the one hand execution of the store-exclusive operation is (at least for the most part) taking place before the predetermined time period expires, but on the other hand only by a predetermined margin, so that too large a time period between execution of the store exclusive operation and the end of the predetermined time period is not allowed to develop.

Viewed from a second aspect a data processing apparatus is provided comprising means for performing data processing operations by executing instructions, said data processing operations comprising accessing data values stored in a memory;

means for storing local copies of a subset of said data values, wherein said means for storing is configured to maintain a status value for each local copy stored in said cache, said status value indicative of a usage status of said local copy with respect to said at least one other means for performing data processing operations; and means for monitoring a selected memory location for accesses, wherein said means for performing data processing operations is configured to execute a load-exclusive operation, said load-exclusive operation comprising loading a first data value from a specified memory location and causing said means for monitoring to begin monitoring said specified memory location, wherein said means for performing data processing operations is configured to execute a store-exclusive operation, said store-exclusive operation comprising storing a second data value to said specified memory location if said exclusive use monitor indicates that said specified memory location has not been accessed since said load-exclusive operation was executed, wherein, when a local copy of said first data value is stored in said means for storing and said status value for said local copy of said first data value indicates an exclusive usage status for said means for performing data processing operations, said data processing apparatus is configured to prevent modification of said status value for a predetermined time period after said means for performing data processing operations has executed said load-exclusive operation.

Viewed from a third aspect a method of data processing is provided comprising the steps of performing data processing operations by executing instructions in a processor unit, said data processing operations comprising accessing data values stored in a memory;

storing local copies of a subset of said data values in a cache, and maintaining a status value for each local copy stored in said cache, said status value indicative of a usage status of said local copy with respect to said at least one other processor unit;

executing a load-exclusive operation, said load-exclusive operation comprising loading a first data value from a specified memory location;

monitoring of said specified memory location for accesses;

executing a store-exclusive operation, said store-exclusive operation configured to cause said processor unit to store a second data value to said specified memory location if said monitoring step indicates that said specified memory location has not been accessed since said load-exclusive operation was executed; and when a local copy of said first data value is stored in said cache and said status value for said local copy of said first data value indicates an exclusive usage status for said processor unit, preventing modification of said status value for a predetermined time period after said processor unit has executed said load-exclusive operation.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
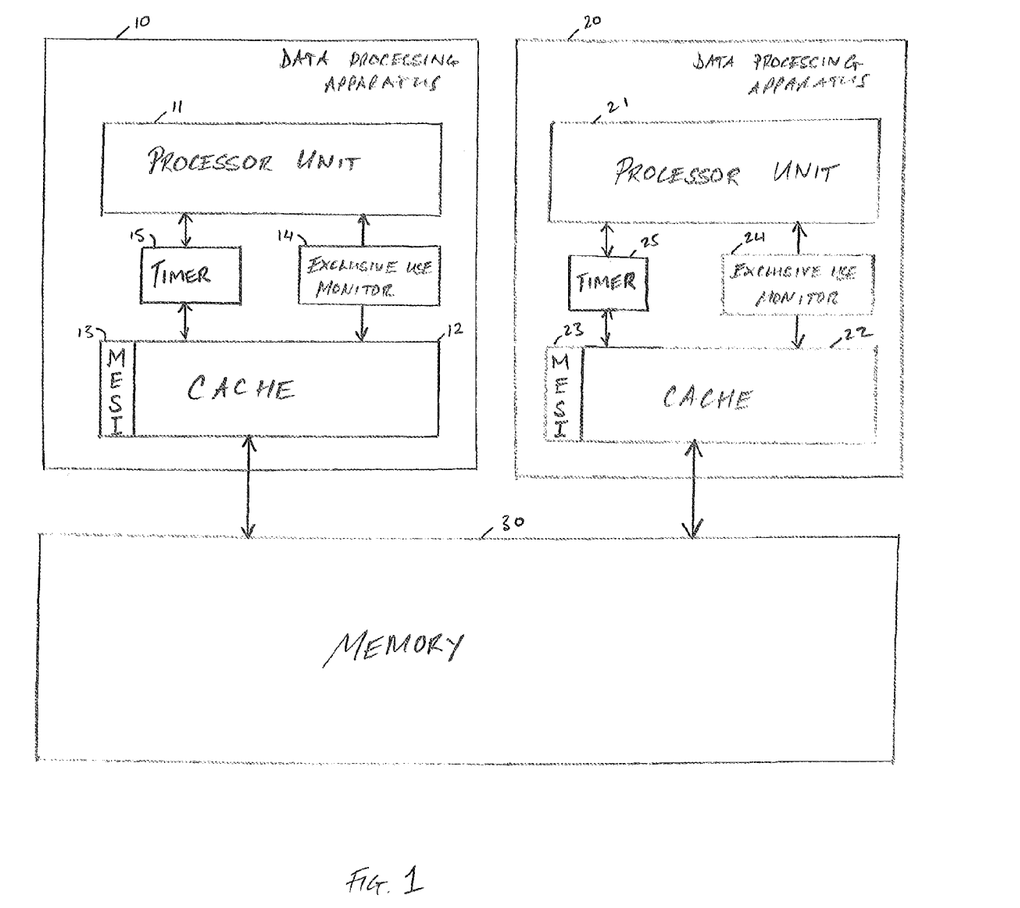
FIG. 1 schematically illustrates two data processing apparatuses sharing access to a cache in one embodiment.

FIG. 1 schematically illustrates a data processing system in one embodiment. The system comprises two data processing apparatuses 10 and 20 and an external memory 30. Each data processing apparatus comprises a processor unit 11, 21 which is configured to perform data processing operations by executing instructions. When the processor unit seeks to access data values stored in the memory 30 as part of its data processing operations, the access request is first received by cache 12, 22. Cache 12, 22 stores a local copy of a subset of the data values stored in the memory 30 such that these are readily accessible to the processor unit 11, 21 and in particular so that the delay associated with accessing the external memory 30 is not incurred each time one of these data values is used for the data processing operations. Further, each cache 12, 22 is configured to store a status value in association with each cache line of the cache. This status value 13, 23 is in this embodiment in accordance with the MESI (modified/exclusive/shared/invalid) protocol, and the two caches 12 and 22 are configured to communicate with one another (for example via a bus which connects data processing apparatus 10, data processing apparatus 20 and memory 30 together, not shown) in accordance with a coherency protocol such that despite the fact that local copies of the same data value may be separately stored in each cache, version control issues do not arise.

Each data processing apparatus 10, 20 also comprises an exclusive use monitor 14, 24. This exclusive use monitor 14, 24 is specifically provided to support the execution of load-exclusive and store-exclusive instructions by the processor unit. The exclusive use monitor is activated by the execution of a load-exclusive operation, and begins monitoring the memory location specified in the load-exclusive operation, in particular monitoring if the data value at that memory location is subsequently modified or not. The execution of a subsequent store-exclusive instruction by the processor unit is then dependent on the exclusive use monitor, in that the store-exclusive instruction specifying the same memory location can only be successfully executed if the exclusive use monitor indicates that the data value at that memory location has not been modified since the load-exclusive operation was executed. Accordingly, the exclusive use monitor 14, 24 is effectively positioned between the processor unit 11, 21 and the cache 12, 22 so that all data accesses issued by the processor unit 11, 21 can be monitored.

In addition, each data processing apparatus further comprises a timer 15, 25 the use of which is also associated with the execution of a load-exclusive instruction by the processor unit. The timer is started by the execution of the load-exclusive operation and is configured to run for a predetermined time period, the elapse of that predetermined time period being notified to the processor unit 11, 21 and/or the cache 12, 22 as required by the particular implementation being carried out (discussed in more detail below). Most importantly, the data processing apparatus 10, 20 is configured to prevent the modification of a status value 13, 23 which indicates "exclusive" status for the cache line in which the local copy of the data value at the memory location specified in the load-exclusive instruction is stored whilst the timer is running. Once the timer 15, 25 has expired, this prevention of modification of the status value is lifted.

Hence, when a load-exclusive operation is executed by processor unit 11, 21 it is determined if a local copy of the data value at the memory location specified in the load-exclusive instruction is currently stored in the cache 12, 22. If it is, and if the cache line in which that local copy is stored is marked as "exclusive" in the status value 13, 23, then the timer 15, 25 is started and modification of that "exclusive" status is prevented until the timer has expired. As will be explained in more detail in the following this helps to ensure that the store-exclusive instruction which follows can be executed and completed as quickly as possible, by ensuring that not only does the local copy stored in the cache 12, 22 remain there (and is not for example evicted by another incoming cache line) but also remains in the "exclusive" state such that delays associated with the cache coherency protocol administered by the caches 12 and 22 do not cause delays to the execution of the store-exclusive instruction.

Figure 2:
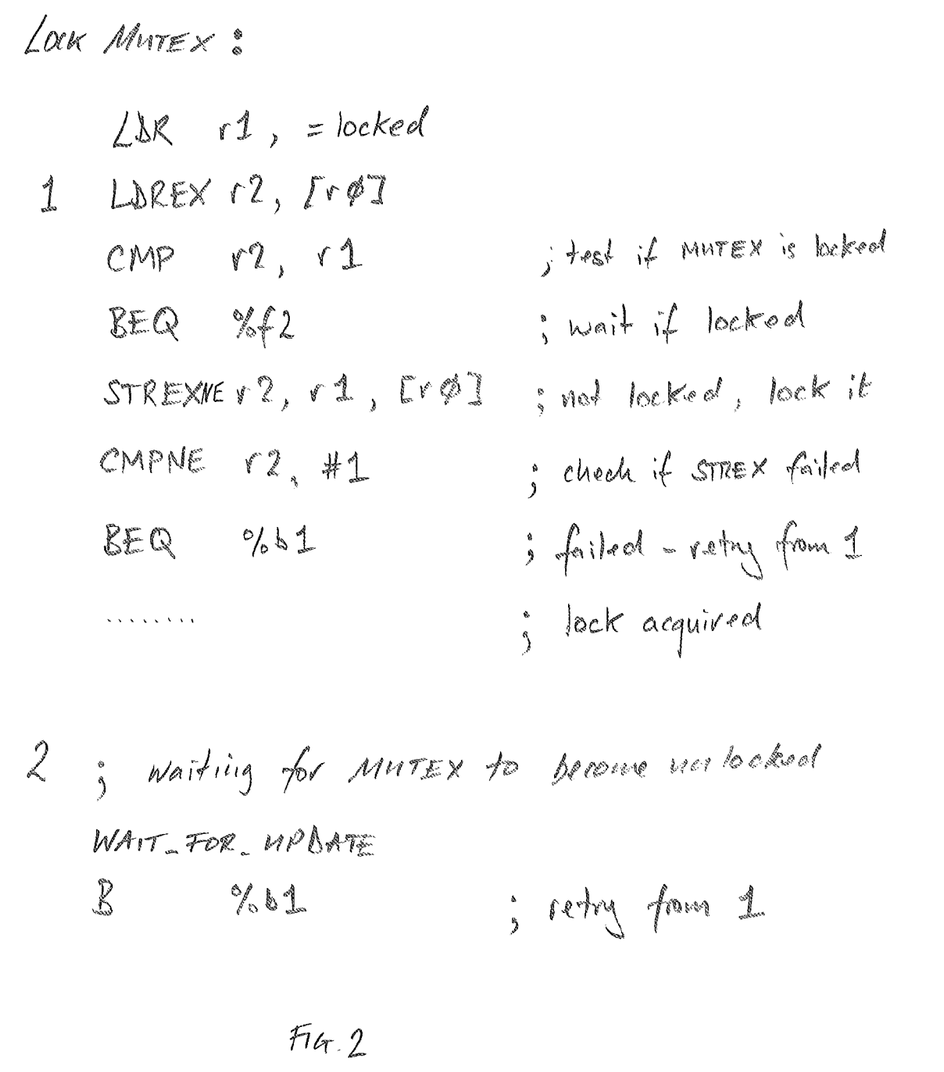
FIG. 2 illustrates an example sequence of instructions which may be executed in one embodiment, including a load-exclusive instruction and a store-exclusive instruction.

FIG. 2 illustrates a sequence of instructions including a load-exclusive instruction and a store-exclusive instruction for which the present techniques may be particularly advantageous. This sequence of instructions implements a "lock mutex" routine which may be carried out by a data processing apparatus such as those illustrated in FIG. 1. The mutex ("mutual exclusion") routine is executed by a data processing apparatus to set a semaphore for other data processing apparatuses sharing the same resource (i.e. memory 30 in FIG. 1) and the use of load-exclusive and store-exclusive instructions ensures that the data processing apparatus seeking access to this semaphore is not disrupted by the activities of another data processing apparatus.

The sequence of steps in the lock mutex routine are as follows. Firstly, the value indicating "locked" is loaded into the register r1. Then the load-exclusive instruction is executed, loading the data value from memory address [r0] into the register r2. It is then tested, by comparison of the content of registers r1 and r2, if the mutex is currently locked or unlocked. If it is locked, then the program flow branches 2 to wait for the mutex to become unlocked. If it is not locked then the processor seeks to set this lock for itself by execution of the store-exclusive instruction, storing the value from register r1 to the memory address [r0]. Note that in this particular example it is a STREXNE instruction which is executed, being conditional on the comparison with register r2 having resulted in an identification that the mutex was not locked. Finally it is determined if the store-exclusive instruction failed and if the store-exclusive did fail then the procedure is retried from 1. The procedure for waiting for the mutex to become unlocked simply consists of a WAIT_FOR_UPDATE delay procedure followed by branching back to 1.

In the context of this lock mutex routine, it will be appreciated that after the load-exclusive instruction has been executed it is advantageous if the store-exclusive instruction is executed as promptly as possible, to avoid the possibility that other activities either of the same processor (for example running in another thread) or of another processor disrupt the acquisition of the mutex lock before the store-exclusive can complete. In particular, when the processor unit executing the load-exclusive instruction has a local cache in which a copy is stored of the data value stored at the memory location [r0], and this cache line is marked as "exclusive" in the MESI protocol, the store-exclusive instruction should, in principle, be able to complete very quickly. However, as discussed it has been found that there are ways in which this can be disrupted. As one example, if another processor unit in the system were to read the same data value from the memory location, this would normally cause the cache line to be updated to "shared" in the MESI protocol. This would cause delay in the subsequent execution of a store-exclusive operation accessing this memory location, since the cache line would have to be returned to "exclusive" status before the store-exclusive operation could occur. The present techniques address this issue.

Figure 3:
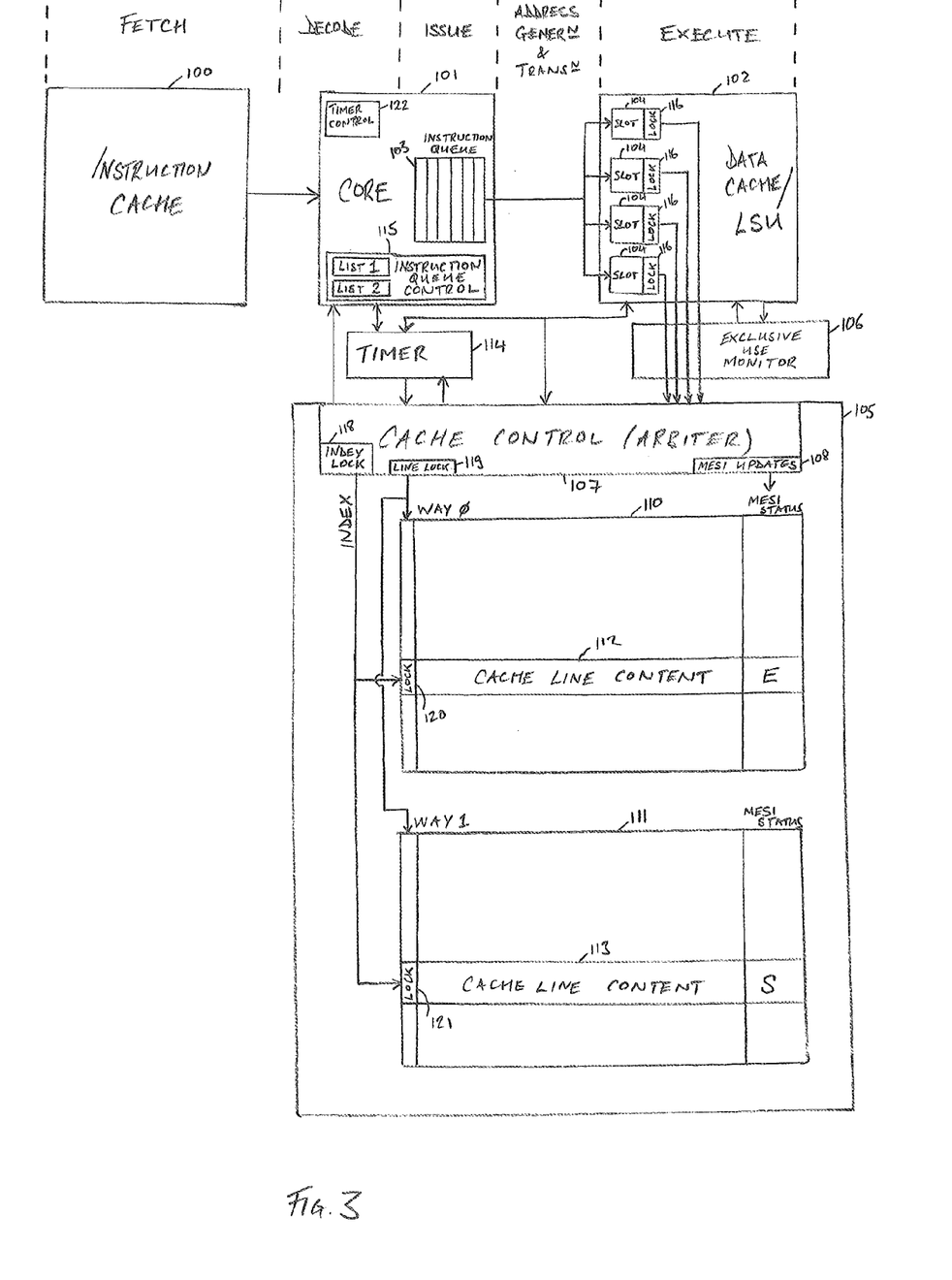
FIG. 3 schematically illustrates the configuration of a data processing apparatus in one embodiment.

FIG. 3 schematically illustrates in more detail some components of a data processing apparatus such as 10, 20 illustrated in FIG. 1. The processor unit is represented here by the instruction cache 100, the core 101 and the data cache/LSU 102. Essentially, instructions from the instruction cache 100 are passed to the core 101 and then on to the data cache/LSU 102 as required for execution. As shown by the stages labelled above these components in the figure, these components carry out the procedural pipeline stages of fetch, decode, issue, address generation/translation and execute. Decoded instructions in the core 101 are entered into the instruction queue 103 to be issued to the data cache/LSU 102 when a slot in the data cache/LSU becomes available. The data cache/LSU 102 has four slots 104 for this purpose. A data access from a slot 104 then passes to cache 105. All accesses to the cache 105 are monitored by exclusive use monitor 106, the activity of the exclusive use monitor 106 being triggered by the execution of a load-executive instruction by execute stage 102.

Accesses to the cache 105 are controlled by the cache control (arbiter) unit 107 which on the one hand performs a cache lookup to determine if a data value which is a subject of a data access is currently stored in the cache, and also administers the MESI protocol, and maintains a status value in association with each cache line stored in the cache indicating its MESI status. A portion of the cache control unit 107 is provided for the purpose of updating these MESI status values, and is labelled 108 in the figure. The cache 105 in FIG. 3 is a set-associative cache and is illustratively shown with two ways 110 and 111 in the figure. More ways might well be provided but only two are illustrated in the figure for clarity of illustration. During a cache lookup the cache control unit 107 generates an index value from the memory address and this index value is used to identify a set of cache lines in which the relevant data value might be stored.

When a load-exclusive instruction is executed by data cache/LSU (execute stage) 102, this triggers the exclusive use monitor 106 to begin monitoring the memory location specified in that load-exclusive instruction. Further, the cache control unit 107 is notified by data cache/LSU 102 that a load-exclusive instruction has been executed and as part of the usual lookup procedure in the cache, the cache control unit 107 determines if, when the lookup hits in the cache, the status value for the cache line in which the hit occurred indicates "exclusive". For example as shown in FIG. 3, the cache line 112 currently has a MESI status of "exclusive" whilst the cache line 113 currently has a MESI status of "shared". The cache hit on a line marked with "exclusive" status causes the data processing apparatus to then take steps which will ensure that this "exclusive" status of the cache line cannot be modified for a predetermined time period after execution of the load-exclusive instruction. This predetermined time period is measured by timer 114 which, in the embodiment shown in FIG. 3, measures this time period as a predetermined number of elapsed clock cycles. In addition, the hit in the cache for a line marked "exclusive" is also signalled to the core 101, and in particular to instruction queue control unit 115 which is provided to administer and control the instruction queue 103. On receipt of this signal, the instruction queue control unit 115 examines the currently pending instructions in the instruction queue 103 and identifies two groups of instructions. Firstly, it identifies instructions which must be completed before the store-exclusive instruction is executed, for example to avoid a hazard condition (or at least the risk of a hazard condition), this first group being stored as list 1. Secondly, it identifies instructions in the instruction queue 103 which, whilst not relating to the same memory location as that specified in the load-exclusive and store-exclusive instructions, could nevertheless affect the local copy of the data value at that memory address in the cache line where the hit happened. For example, these may be instructions where the same index is to be found in the memory address specified by that instruction, meaning that execution of this instruction would evict the cache line or merely because the memory address of that instruction is not yet known (only to be determined at the address generation and translation stage) and thus to ensure that execution of the load-exclusive/store-exclusive pair will not be disrupted by such an instruction it is added to this second group (list 2). Then, the instructions identified in list 1 are forced to complete as soon as possible, being raised in priority as far as possible, whilst instructions identified in list 2 are stalled until after the store exclusive instruction itself has executed. A particular technique employed by the data processing apparatus shown in FIG. 3 to stall the instructions identified in list 2 is that each slot 104 in the data cache/LSU unit 102 is provided with a locking mechanism 116 and any instruction identified in list 2 which is allocated to a slot 104 can be stalled by simply locking that slot. This lock can be lifted once the timer expires.

The cache control unit 107 is also configured to prevent modification of the "exclusive" status value. At the broadest level, the cache control unit 107 can simply lock access to the whole cache. Whilst this may be efficient to implement, it may be desirable to allow access to unaffected regions of the cache to continue in the interim, and so the cache control unit 107 is configured to lock access to the particular portion of the cache in which the hit occurred. One mechanism to implement this is the index lock unit 118 which locks usage of the index for that cache line, although this of course locks not only cache line 112 in the illustrated example, but also cache line 113. A more targeted locking mechanism is provided by line lock unit 119, which is configured to set a lock value applicable to the specific cache line. Accordingly, in the example illustrated in FIG. 3 the line lock unit 119 can set the lock 120 to lock cache line 112, whilst lock 121 for cache line 113 is not set meaning that access to this cache line may continue in the interim whilst the timer 114 is running. Whichever locking mechanism is implemented, this lock is set until the timer 114 indicates that the predetermined time period has expired. Note that core 101 further comprises timer control unit 122, which is provided to monitor the suitability of the predetermined time period for which the timer 114 has been set to run and to adjust this if necessary, as will be described later with respect to FIG. 5.

Figure 4:
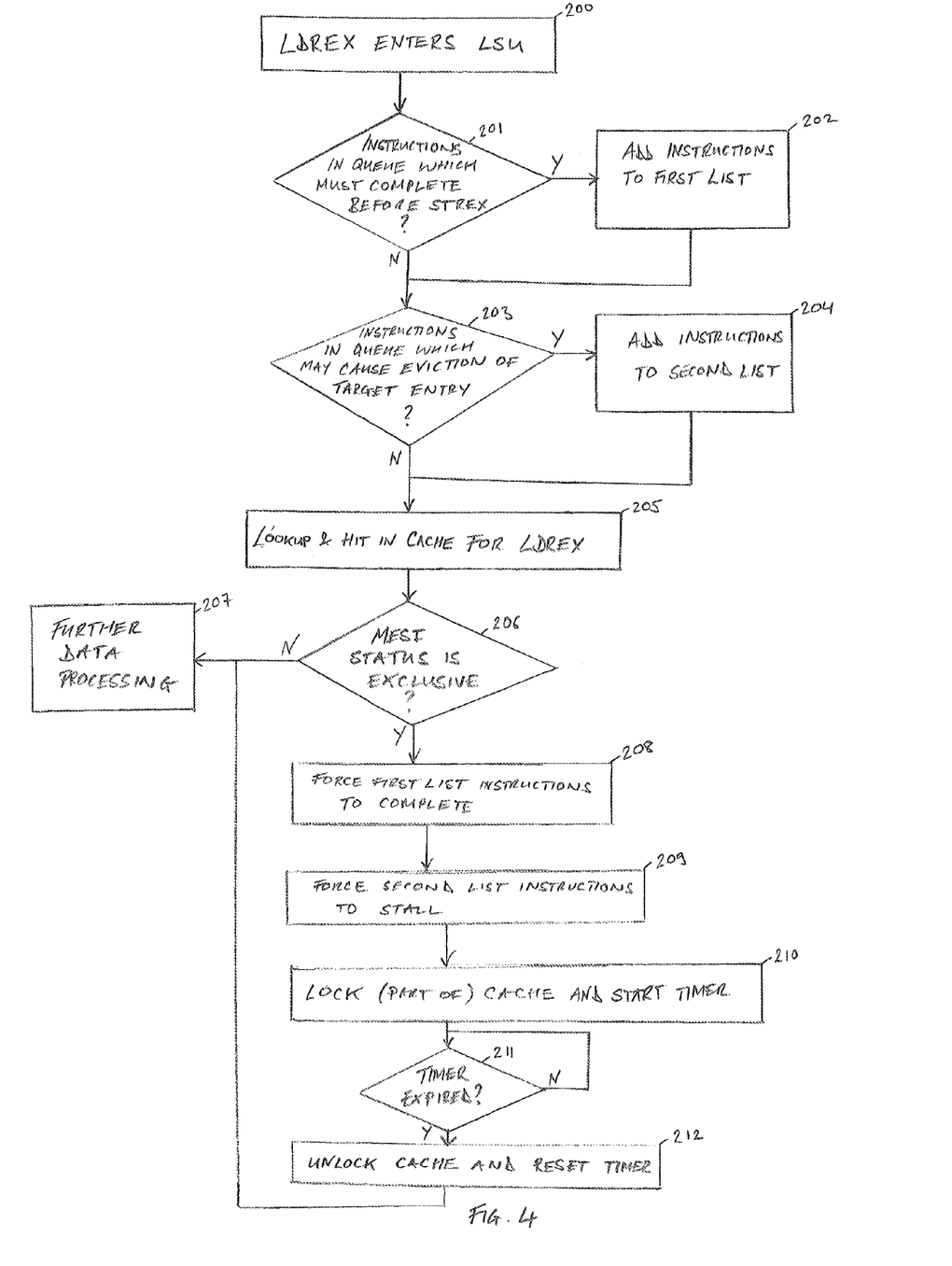
FIG. 4 schematically illustrates a series of steps which are carried out in one embodiment.

FIG. 4 schematically illustrates a series of steps which may be taken in a data processing apparatus in one embodiment. At step 200 a load-exclusive instruction LDREX enters the execute stage, i.e. data cache/LSU 102. It is then determined, at step 201, if there are instructions in the pending instruction queue 103 which must complete before execution of the store-exclusive instruction STREX which is expected to follow the LDREX. If such instructions are identified these are added to a first list at step 202. Then at step 203 it is determined if there are instructions in the pending instruction queue 103 which have the potential to cause eviction of the target entry in the cache and if such instructions are identified these are added to a second list at step 204. Then at step 205 the lookup is performed in the cache and here it is assumed to hit. Then at step 206 it is determined if the status of the cache line which hit is exclusive. If it isn't then the flow moves to step 207 where further data processing continues and the present techniques are not relevant. If however the status is identified as exclusive then at step 208, any instructions added to the first list are forced to complete i.e. steps are taken to allow these instructions to move as fast as possible through the pipeline, for example by maximising a priority associated with them and/or bringing them earlier in the queue for execution. At step 209 any instructions added to the second list are stalled, for example, as discussed above by locking the LSU slots to which these instructions are (to be) allocated. Then at step 210 at least the part of the cache in which the hit cache line is to be found is locked and the timer is started. Step 211 loops on itself whilst the timer is still running and once the timer expires the flow proceeds to step 212 where the cache is unlocked and the timer is reset. The flow then continues to step 207.

Figure 5:
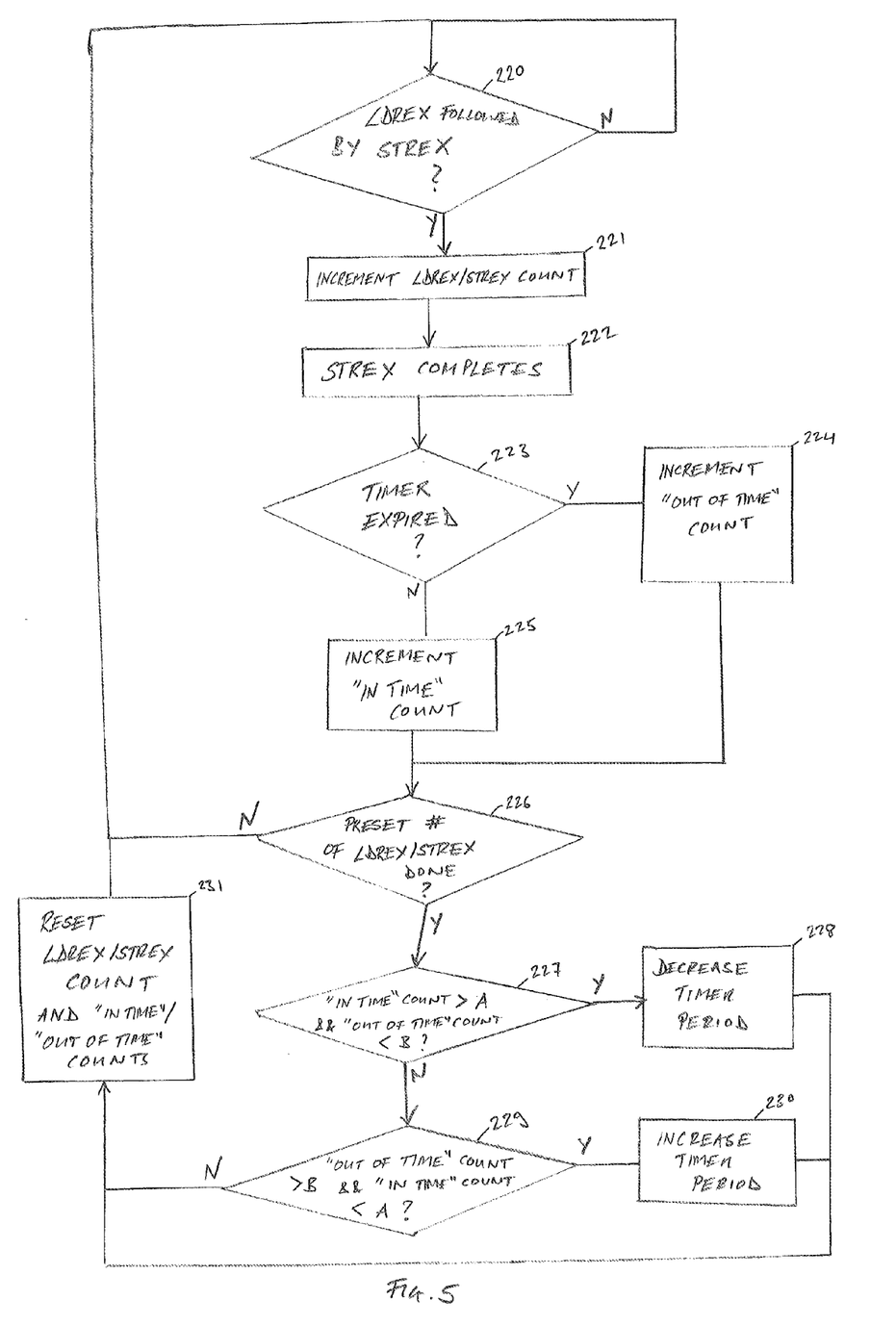
FIG. 5 schematically illustrates a series of steps which are carried out in one embodiment.

FIG. 5 schematically illustrates a sequence of steps which are essentially administered by the timer control 122 shown in FIG. 3 within the wider context of the core 101 to determine on an on-going basis if the predetermined time period for which the timer 114 runs is appropriate. The flow can be considered to begin at step 220 where it is determined if a load-exclusive instruction is followed by a store-exclusive instruction. If it is then the timer control increments a load-exclusive/store-exclusive pair count at step 211. Once the store exclusive instruction completes at step 222 then it is determined at step 223 if the timer has already expired. If it has then at step 224 an "out of time" count is incremented by the timer control 122, whereas if it has not then at step 225 an "in time" count is incremented by the timer control 122. Then at step 226 it is determined if a pre-set number of load-exclusive/store exclusive instruction pairs has been seen. This pre-set number is set in advance to enable an appropriate statistical sample to be gathered. Whilst this pre-set number has not been reached the flow loops back to step 220. Once this pre-set number of load-exclusive/store-exclusive instruction pairs has been seen then at step 227 the timer control unit 122 determines if the "in time" count exceeds a pre-set threshold A and if the "out of time" count is less than a pre-set threshold B. Appropriate setting of threshold A and B therefore enables this step to determine if the time period of the timer is generally too long in that the store-exclusive instructions are typically completing within the time period. This being the case the flow proceeds to step 228 where the timer period is decreased by an amount appropriate to the setting of the thresholds A and B. Conversely if at step 229 it is determined that the "out of time" count exceeds threshold B and the "in time" count is not greater than threshold A then the conclusion is drawn that the period of the timer is too short in that store exclusive instructions are typically completing after the timer has expired. In this case the flow proceeds to step 230 where the timer period is increased by an increment appropriate to the thresholds A and B. The flow then proceeds to step 231 where the load-exclusive/store-exclusive instruction pair count and the "in time" and "out of time" counts are all reset and the flow returns to step 220 for the on-going monitoring to continue.

In overall summary, the present techniques provide a data processing apparatus in which a processor unit accesses data values stored in a memory and a cache stores local copies of a subset of the data values. The cache maintains a status value for each local copy stored in the cache. When the processor unit executes a load-exclusive operation, a first data value is loaded from a specified memory location and an exclusive use monitor begins monitoring the specified memory location for accesses. When the processor unit executes a store-exclusive operation, a second data value is stored to the specified memory location if the exclusive use monitor indicates that the first data value has not been modified since the load-exclusive operation was executed. When a local copy of the first data value is stored in the cache and the status value for the local copy of the first data value indicates that the processor unit has exclusive usage of the first data value, the data processing apparatus is configured to prevent modification of the status value for a predetermined time period after the processor unit has executed the load-exclusive operation. The likelihood of successful execution of the store-exclusive operation is thus increased by ensuring that it is executed as soon as possible.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
    a processor configured to perform data processing operations by executing instructions, said data processing operations comprising accessing data values stored in a memory;
    a cache configured to store local copies of a subset of said data values, wherein said cache is configured to maintain a status value for each local copy stored in said cache; and
    an exclusive use monitor configured to monitor a selected memory location for accesses,
    wherein said processor is configured to execute a load-exclusive operation, said load-exclusive operation comprising loading a first data value from a specified memory location and causing said exclusive use monitor to begin monitoring said specified memory location,
    wherein said processor is configured to execute a store-exclusive operation, said store-exclusive operation comprising storing a second data value to said specified memory location if said exclusive use monitor indicates that said first data value at said specified memory location has not been modified since said load-exclusive operation was executed,
    and wherein, when a local copy of said first data value is stored in said cache and said status value for said local copy of said first data value indicates that said processor has exclusive usage of said first data value, said data processing apparatus is configured to prevent modification of said status value for a predetermined time period after said processor has executed said load-exclusive operation,
    a pending instruction queue populated by pending instructions which have been decoded but not yet executed, wherein said data processing apparatus is configured to prevent modification of said status value with reference to said pending instructions,
    wherein said data processing apparatus is configured to identify a first set of pending instructions in said pending instruction queue when an instruction configured to cause execution of at least part of said load-exclusive operation is in said pending instruction queue,
    wherein execution of said first set of pending instructions must be completed before execution of said store-exclusive operation completes, and said data processing apparatus is configured to prioritize execution of said first set of pending instructions.

2. The data processing apparatus as claimed in claim 1, wherein said memory is shared with at least one other processor and said cache is configured to maintain said status value for each local copy stored in said cache in dependence on a coherency protocol administered for said processor and said at least one other processor.

3. The data processing apparatus as claimed in claim 1, wherein execution of said first set of pending instructions must be completed before execution of said store-exclusive operation completes to avoid a hazard condition risk with respect to said specified memory location.

4. The data processing apparatus as claimed in claim 1, wherein said data processing apparatus is configured to allow instructions in said first set of pending instructions to complete before said load-exclusive operation completes, even if said instructions in said first set of pending instructions have been scheduled to complete after said load-exclusive operation.

5. The data processing apparatus as claimed in claim 1, wherein said data processing apparatus is configured to prevent modification of said status value by locking access to at least part of said cache.

6. The data processing apparatus as claimed in claim 5, wherein said data processing apparatus is configured to prevent modification of said status value by locking access to a cache line in which said local copy of said first data value is stored said cache.

7. The data processing apparatus as claimed in claim 5, wherein said cache is configured to store each said local copy of a data value in a location in said cache determined by an index portion of a memory address of said data value, and wherein said data processing apparatus is configured to prevent modification of said status value by locking access to regions of said cache identified by said index portion.

8. The data processing apparatus as claimed in claim 1, further comprising a timer configured to run for said predetermined time period, wherein said data processing apparatus is configured to start said timer when said processor executes said load-exclusive operation.

9. The data processing apparatus as claimed in claim 1, wherein said data processing apparatus is configured to count elapsed clock cycles after said processor executes said load-exclusive operation, and said predetermined time period is determined as a predetermined number of elapsed clock cycles.

10. The data processing apparatus as claimed in claim 1, wherein said data processing apparatus is configured to determine, for each of multiple instances of execution of said load-exclusive operation followed by said store-exclusive instruction, a relative timing of execution of said store-exclusive operation by said processor and an end of said predetermined time period after said processor has executed said load-exclusive operation.

11. The data processing apparatus as claimed in claim 10, wherein said data processing apparatus is configured to increase said predetermined time period if more than a predetermined number of said relative timings indicate that execution of said store-exclusive operation by said processor has occurred after said end of said predetermined time period after said processor has executed said load-exclusive operation.

12. The data processing apparatus as claimed in claim 10, wherein said data processing apparatus is configured to decrease said predetermined time period if more than a predetermined number of said relative timings indicate that execution of said store-exclusive operation by said processor has occurred more than a predetermined margin before said end of said predetermined time period after said processor has executed said load-exclusive operation.

13. A data processing apparatus comprising:
 a processor configured to perform data processing operations by executing instructions, said data processing operations comprising accessing data values stored in a memory;
 a cache configured to store local copies of a subset of said data values, wherein said cache is configured to maintain a status value for each local copy stored in said cache; and
 an exclusive use monitor configured to monitor a selected memory location for accesses,
 wherein said processor is configured to execute a load-exclusive operation, said load-exclusive operation comprising loading a first data value from a specified memory location and causing said exclusive use monitor to begin monitoring said specified memory location,
 wherein said processor is configured to execute a store-exclusive operation, said store-exclusive operation comprising storing a second data value to said specified memory location if said exclusive use monitor indicates that said first data value at said specified memory location has not been modified since said load-exclusive operation was executed,
 and wherein, when a local copy of said first data value is stored in said cache and said status value for said local copy of said first data value indicates that said processor has exclusive usage of said first data value, said data processing apparatus is configured to prevent modification of said status value for a predetermined time period after said processor has executed said load-exclusive operation,
 a pending instruction queue populated by pending instructions which have been decoded but not yet executed, wherein said data processing apparatus is configured to prevent modification of said status value with reference to said pending instructions,
wherein said data processing apparatus is configured to identify a second set of pending instructions in said pending instruction queue when an instruction configured to cause execution of at least part of said load-exclusive operation is in said pending instruction queue, wherein execution of instructions of said second set of pending instructions will not affect said specified memory location, but said execution of instructions of said second set of pending instructions has potential to affect said local copy of said first data value stored in said cache,
 and said data processing apparatus is configured to prevent said modification of said status value for said predetermined time period by preventing said second set of pending instructions from affecting said local copy of said first data value stored in said cache.

14. The data processing apparatus as claimed in claim 13, wherein said data processing apparatus is configured to cause said second set of pending instructions to stall for said predetermined time period.

15. The data processing apparatus as claimed in claim 14, wherein said data processing apparatus comprises a load-store configured to execute load instructions and store instructions, wherein said load-store comprises a set of slots to which each load or store instruction currently being handled is allocated, and wherein said load-store is configured to lock for said predetermined time period at least one said slot to which an instruction of said second set of pending instructions is allocated.

16. A data processing apparatus comprising:
 means for performing data processing operations by executing instructions, said data processing operations comprising accessing data values stored in a memory;
 means for storing local copies of a subset of said data values, wherein said means for storing is configured to maintain a status value for each local copy stored in said cache, said status value indicative of a usage status of said local copy with respect to said at least one other means for performing data processing operations; and
 means for monitoring a selected memory location for accesses,
 wherein said means for performing data processing operations is configured to execute a load-exclusive operation, said load-exclusive operation comprising loading a first data value from a specified memory location and causing said means for monitoring to begin monitoring said specified memory location,
 wherein said means for performing data processing operations is configured to execute a store-exclusive operation, said store-exclusive operation comprising storing a second data value to said specified memory location if said exclusive use monitor indicates that said specified memory location has not been accessed since said load-exclusive operation was executed,
 wherein, when a local copy of said first data value is stored in said means for storing and said status value for said local copy of said first data value indicates an exclusive usage status for said means for performing data processing operations, said data processing apparatus is configured to prevent modification of said status value for a predetermined time period after said means for performing data processing operations has executed said load-exclusive operation,
 means for storing pending instructions which have been decoded but not yet executed, wherein said data processing apparatus is configured to prevent modification of said status value with reference to said pending instructions,
 wherein said data processing apparatus is configured to identify a first set of pending instructions in said means for storing pending instructions when an instruction configured to cause execution of at least part of said load-exclusive operation is in said means for storing pending instructions,
 wherein execution of said first set of pending instructions must be completed before execution of said store-exclusive operation completes, and said data processing apparatus is configured to prioritize execution of said first set of pending instructions.

17. A method of data processing comprising the steps of:
 performing data processing operations by executing instructions in a processor, said data processing operations comprising accessing data values stored in a memory;
 storing local copies of a subset of said data values in a cache, and maintaining a status value for each local copy stored in said cache, said status value indicative of a usage status of said local copy with respect to said at least one other processor;
 executing a load-exclusive operation, said load-exclusive operation comprising loading a first data value from a specified memory location;
 monitoring of said specified memory location for accesses;
 executing a store-exclusive operation, said store-exclusive operation configured to cause said processor to store a second data value to said specified memory location if said monitoring step indicates that said specified memory location has not been accessed since said load-exclusive operation was executed;

when a local copy of said first data value is stored in said cache and said status value for said local copy of said first data value indicates an exclusive usage status for said processor, preventing modification of said status value for a predetermined time period after said processor has executed said load-exclusive operation, populating a pending instruction queue by pending instructions which have been decoded but not yet executed;

preventing modification of said status value with reference to said pending instructions; and identifying a first set of pending instructions in said pending instruction queue when an instruction configured to cause execution of at least part of said load-exclusive operation is in said pending instruction queue, wherein execution of said first set of pending instructions must be completed before execution of said store-exclusive operation completes, and said data processing apparatus prioritizes execution of said first set of pending instructions.

* * * * *